(12) United States Patent
Bakhsh et al.

(10) Patent No.: US 6,471,240 B2
(45) Date of Patent: Oct. 29, 2002

(54) INFLATABLE SIDE CURTAIN

(75) Inventors: Ali Emam Bakhsh, Rochester Hills; Ayad Nayef, Sterling Heights; Russell E. Stein, Leonard, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/956,227

(22) Filed: Sep. 19, 2001

(65) Prior Publication Data

US 2002/0014762 A1 Feb. 7, 2002

Related U.S. Application Data (63) Continuation of application No. 09/579,162, filed on May 25, 2000, now abandoned.
(60) Provisional application No. 60/190,199, filed on Mar. 17, 2000.

(51) Int. Cl.[7] ............ B60R 21/22; B60R 21/24
(52) U.S. Cl. ............ 280/729; 280/730.2
(58) Field of Search ............ 280/729, 730.2, 280/743.1, 743.2, 749, 730.1

(56) References Cited

U.S. PATENT DOCUMENTS

| | | |
|---|---|---|
| 3,731,949 A | 5/1973 | Radke |
| 5,427,410 A | 6/1995 | Shiota et al. |
| 5,439,247 A | 8/1995 | Kolb |
| 5,524,924 A | 6/1996 | Steffens, Jr. et al. |
| 5,588,672 A | 12/1996 | Karlow et al. |
| 5,730,463 A | 3/1998 | Fisher et al. |
| 5,788,270 A | 8/1998 | Haland et al. |
| 5,865,462 A | 2/1999 | Robins et al. |
| 5,884,937 A | 3/1999 | Yamada |
| 5,899,490 A | 5/1999 | Wipasuramonton et al. |
| 5,899,491 A | 5/1999 | Tschaeschke |
| 5,924,723 A | 7/1999 | Brantman et al. |
| 5,957,487 A | 9/1999 | Stütz |
| 5,960,611 A | 10/1999 | Aigner et al. |
| 6,010,149 A | 1/2000 | Riedel et al. |
| 6,032,977 A | 3/2000 | Reh et al. |
| 6,056,316 A | 5/2000 | Yamaji et al. |
| 6,073,961 A | 6/2000 | Bailey et al. |
| 6,082,761 A | 7/2000 | Kato et al. |

(List continued on next page.)

FOREIGN PATENT DOCUMENTS

| | | |
|---|---|---|
| DE | 4134995 | 3/1993 |
| DE | 4307175 | 9/1993 |
| DE | 19743626 | 4/1998 |
| DE | 29914637 | 1/2000 |
| GB | 23143000 | 12/1997 |
| JP | 11-48906 | * 2/1999 |

Primary Examiner—Peter C. English
(74) Attorney, Agent, or Firm—Tarolli, Sundheim, Covell, Tummino & Szabo L.L.P.

(57) ABSTRACT

Apparatus (10) for helping to protect an occupant of a vehicle (12) that has a side structure (16) and a roof (18) includes an inflatable vehicle occupant protection device (14) that is inflatable into a position between the side structure of the vehicle and a vehicle occupant. An inflation fluid source (24) provides inflation fluid for inflating the protection device (14). The protection device (14), when inflated, has a perimeter (44) and front and rear portions (58 and 60) spaced apart horizontally along the protection device. The protection device (14) includes overlying panels (40 and 42) that define an inflatable volume and at least one connection (80) within the perimeter (44) at which the overlying panels are interconnected. The at least one connection (80) defines inflatable chambers (100) of the protection device (14) that extend between the front and rear portions (58 and 60) in a generally horizontal direction when the protection device is inflated. The front and rear portions (58 and 60) are inflated more rapidly away from the vehicle roof (18) than the chambers (100) are inflated when the protection device (14) is inflated.

26 Claims, 4 Drawing Sheets

U.S. PATENT DOCUMENTS

| | | |
|---|---|---|
| 6,135,492 A | 10/2000 | Zimmerbeutel et al. |
| 6,155,596 A | 12/2000 | Nakajima et al. |
| 6,168,191 B1 | 1/2001 | Webber et al. |
| 6,170,860 B1 | 1/2001 | Denz et al. |
| 6,186,534 B1 | 2/2001 | Heinz |
| 6,199,898 B1 | 3/2001 | Masuda et al. |
| 6,220,625 B1 | 4/2001 | Wallner et al. |
| 6,234,516 B1 | 5/2001 | Boxey |
| 6,237,937 B1 | 5/2001 | Kokeguchi et al. |
| 6,250,668 B1 | 6/2001 | Breed et al. |
| 6,273,456 B1 * | 8/2001 | Heigl ......................... 280/729 |

* cited by examiner

INFLATABLE SIDE CURTAIN

CROSS-REFERENCE TO RELATED APPLICATIONS

This application is a continuation of U.S. application Ser. No. 09/579,162, filed on May 25, 2000, now abandoned.

The nonprovisional application designated above, namely application Ser. No. 09/579,162, filed May 25, 2000 claims the benefit of U.S. Provisional Application No. 60/190,199 filed on Mar. 17, 2000.

FIELD OF INVENTIONS

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant, and the side structure of the vehicle in the event of a side impart or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus comprises an inflatable vehicle occupant protection device that is inflatable away from the vehicle roof into a position between the side structure of the vehicle and a vehicle occupant. The apparatus further comprises an inflation fluid source that provides inflation fluid for inflating the inflatable vehicle occupant protection device. The inflatable vehicle occupant protection device, when inflated, has a perimeter and front and rear portions spaced apart horizontally along the inflatable vehicle occupant protection device.

The inflatable vehicle occupant protection device includes overlying panels that define an inflatable volume and at least one connection within the perimeter at which the overlying panels are interconnected. The at least one connection defines inflatable chambers of the inflatable vehicle occupant protection device that extend between the front and rear portions in a generally horizontal direction when the inflatable vehicle occupant protection device is inflated. The front and rear portions are inflated more rapidly away from the vehicle roof than the inflatable chambers are inflated away from the vehicle roof when the inflatable vehicle occupant protection device is inflated.

The at least one connection extends in a generally horizontal direction when the inflatable vehicle occupant protection device is inflated, and includes first and second end portions and a middle portion located between the first and second end portions. The first and second end portions and the middle portion each have a width measured in a direction perpendicular to the horizontal direction along which the at least one connection extends. The width of the middle portion is greater than the width of the first and second end portions.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION PREFERRED EMBODIMENTS

Figure 1:
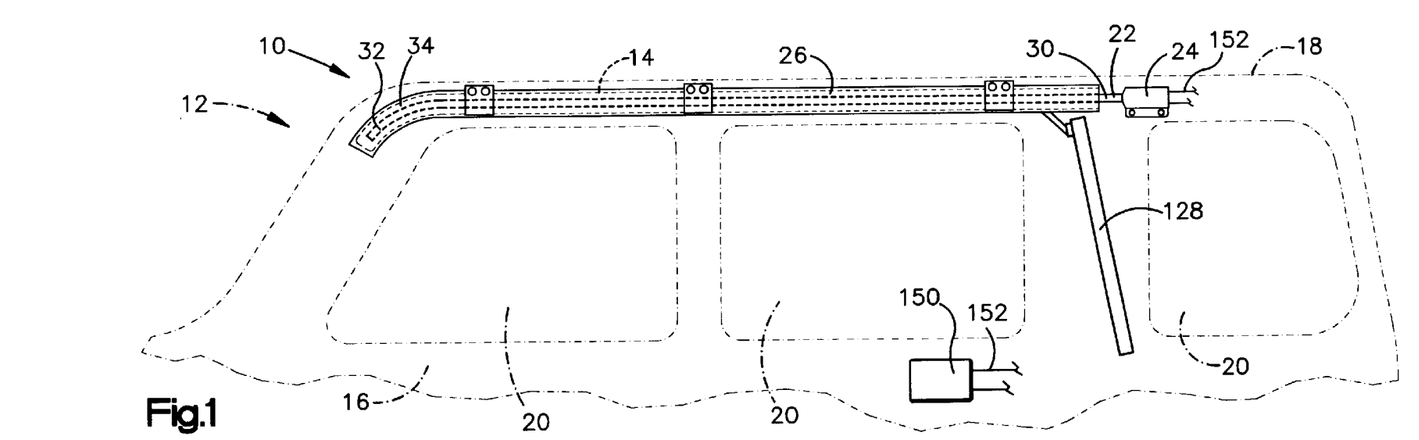
FIG. 1 is a schematic view of an inflatable apparatus for helping to protect an occupant of a vehicle according to a first embodiment of the present invention illustrating the apparatus in a deflated condition.
Figure 2:
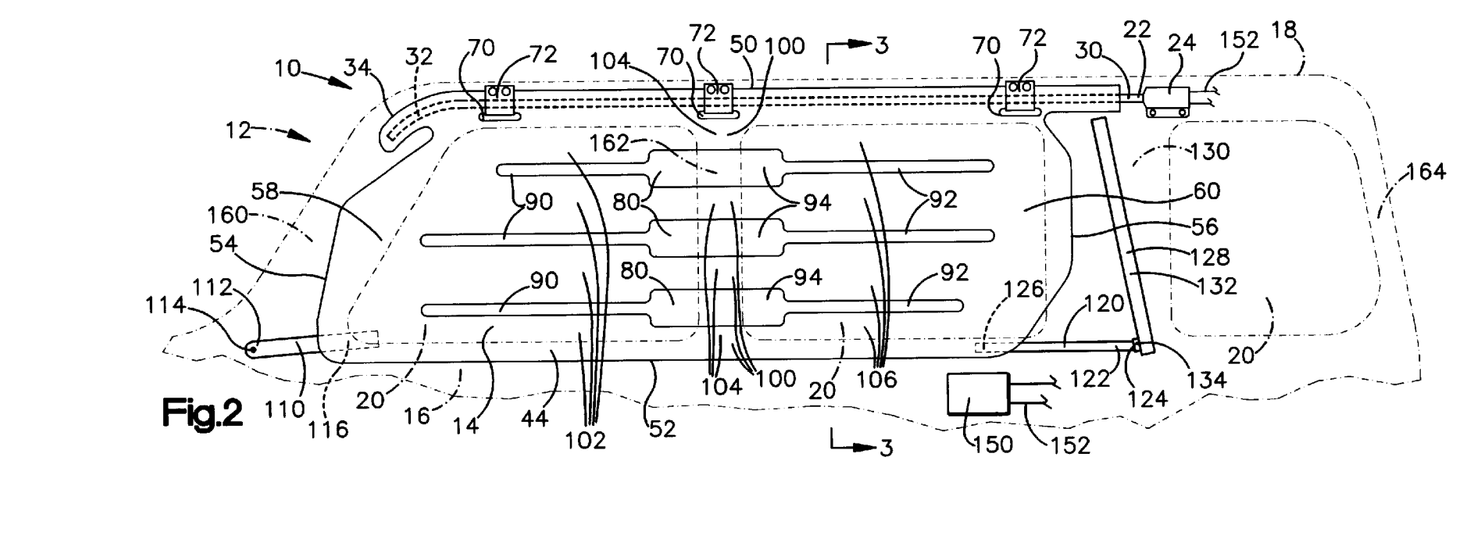
FIG. 2 is a schematic view of the apparatus of FIG. 1 in an inflated condition.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 positioned in the inflatable curtain 14 in a pocket 34 of the curtain. The fill tube 22 has a plurality of openings (not shown), that provide fluid communication between the fill tube 22 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 22 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and the housing 26 have an elongated configuration and extend along the vehicle roof 18 and along the side structure 16 of the vehicle 12 above the side windows 20.

Figure 3:
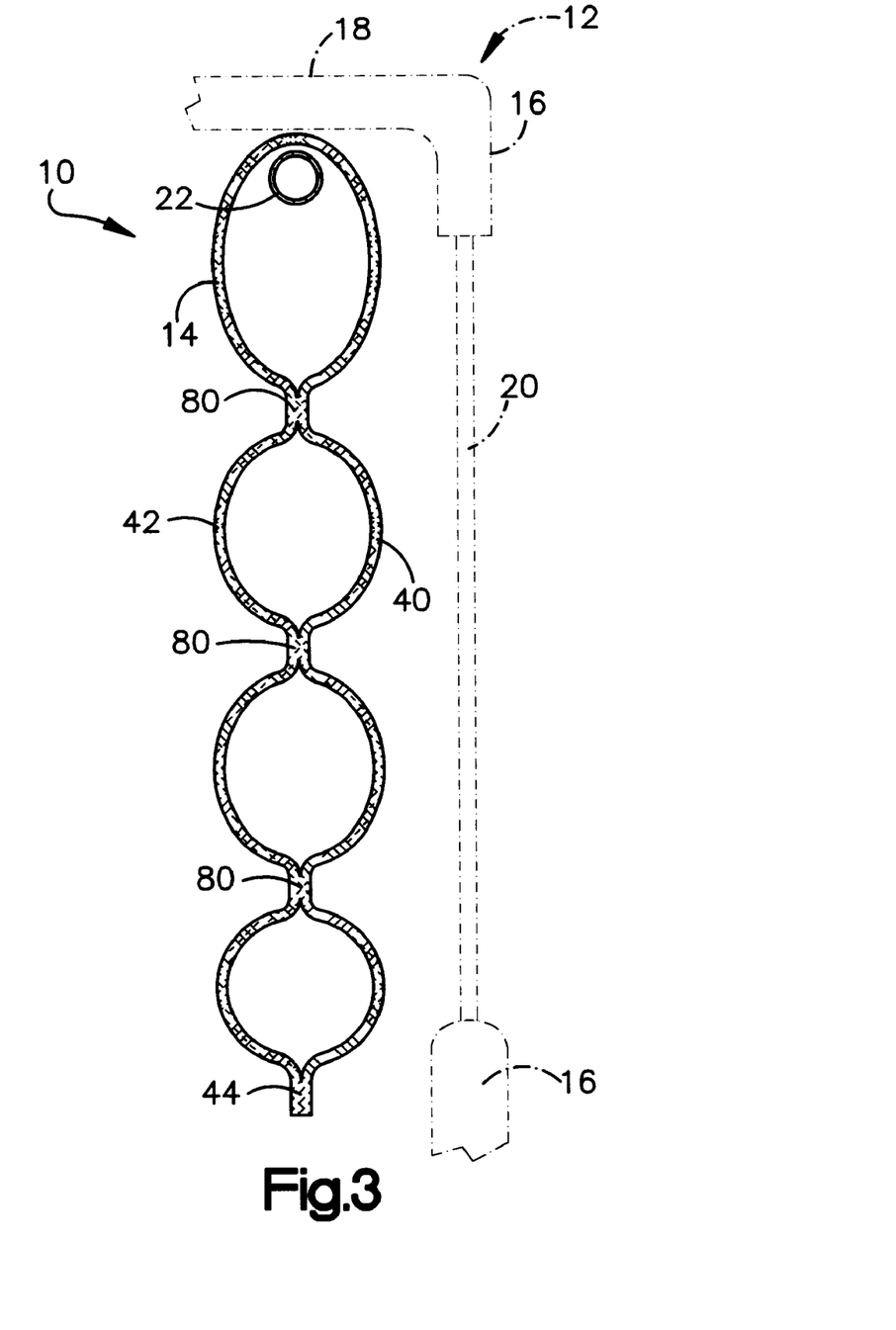
FIG. 3 is a sectional view of the apparatus of FIG. 2 taken generally along line 3—3 in FIG. 2.

As best illustrated in FIG. 3, the inflatable curtain 14 comprises first and second panels 40 and 42 that are arranged in an overlying manner. The first and second panels 40 and 42 are woven together along the perimeter 44 (FIGS. 2 and 3) of the panels to define an inflatable volume. The perimeter 44 is defined at least partially by an upper edge 50 (FIG. 2) of the inflatable curtain 14, an opposite lower edge 52 of the curtain, and front and rear edges 54 and 56, respectively, of the curtain that are spaced apart horizontally along the upper and lower edges.

The front and rear edges 54 and 56 of the inflatable curtain 14 partially define front and rear portions 58 and 60, respectively, that are spaced apart horizontally along the upper and lower edges 50 and 52 and extend between the upper and lower edges. In the embodiment illustrated in FIG. 2, the front and rear edges 54 and 56 extend between the upper and lower edges 50 and 52. The front and rear edges 54 and 56, however, could be omitted and the upper and lower edges 50 and 52 could be extended until they intersect, in which case the front and rear portions 58 and 60 would be defined by the intersecting upper and lower edges.

As illustrated in FIG. 3, the inflatable curtain 14 is woven as a single piece of material to form the overlying first and second panels 40 and 42. It will be recognized by those skilled in the art, however, that the inflatable curtain 14 could have alternative constructions. For example, the first and second panels 40 and 42 could be formed from a sheet of material that is folded over and secured along a portion of the perimeter 44 by means, such as stitching, to form the inflatable curtain 14. The first and second panels 40 and 42 could also be formed from separate sheets of material arranged in an overlying manner and secured together by means, such as stitching, that extends around the entire perimeter 44 of the panels to form the inflatable curtain 14.

The inflatable curtain is preferably constructed of a woven fabric, such as nylon, that is coated with a gas impermeable material, such as urethane or silicone. The inflatable curtain 14 thus may have a substantially airtight construction. Other materials, such as elastomers, plastic films, or combinations thereof may also be used to construct the inflatable curtain 14, in which case the curtain may have a non-woven construction. The materials used to construct the inflatable curtain 14 may also be single or multilayered materials.

As illustrated in FIG. 2, the inflatable curtain 14 may include apertures 70 for receiving connecting devices 72, such as clamps, for securing the curtain 15 to the vehicle 12. The apertures 70 extend through the inflatable curtain 14 and are surrounded by portions of the first and second panels 40 and 42 that are woven together to help reinforce the apertures 70 and help prevent leakage of inflation fluid from the inflatable curtain 14 when the curtain is inflated.

The first and second panels 40 and 42 could also be interconnected around the apertures 70 and/or around the perimeter 44 by means such as stitching, dielectric sealing, ultrasonic bonding, heat sealing, and adhesives.

As illustrated in FIG. 2, the inflatable curtain 14 includes at least one connection 80 that is not part of the perimeter 44 of the curtain, but is located within the perimeter 44 of the curtain. In the embodiment illustrated in FIG. 2, there are three such connections 80. The first and second panels 40 and 42 (FIG. 3) preferably are interconnected at the connections 80 by weaving the panels together. Alternative means (not shown) such as dielectric sealing, ultrasonic bonding, heat sealing, and adhesives may also be used to form the connections 80, depending upon the material used to construct the inflatable curtain 14. The first and second panels 40 and 42 may also be connected together at the connections 80 by tethers that correspond to the shape and pattern of the connections and are sewn or otherwise secured to the panels 40 and 42 to interconnect the panels.

The connections 80 (FIG. 2) extend in a generally horizontal direction, parallel to the upper and lower edges 50 and 52 of the inflatable curtain 14, between the front and rear portions 58 and 60 of the curtain. As illustrated in FIG. 2, each of the connections 80 includes a first end portion 90, an opposite second end portion 92, and a middle portion 94 located between the first and second end portions. The first end portions 90 of the connections 80 terminate adjacent the front portion 58 of the inflatable curtain 14. The second end portions 92 of the connections 80 terminate adjacent the rear portion 60 of the inflatable curtain 14. Each of the first end portion 90, second end portion 92, and middle portion 94 of each connection 80 has a width measured perpendicular to the horizontal direction along which the connection extends. The width of the middle portion 94 is greater than the widths of the first and second end portions 90 and 92.

The connections 80 help to define inflatable chambers 100 of the inflatable curtain 14 that are in fluid communication with each other. The chambers 100 extend along the inflatable curtain 14, in a generally horizontal direction, between the front and rear portions 58 and 60 of the curtain. In the embodiment illustrated in FIG. 2, the inflatable chambers 100 include a first end portion 102, an opposite second end portion 106, and a middle portion 104 located between the first and second end portions. The first end portions 102 of the chambers 100 are positioned adjacent the front portion 58 of the inflatable curtain 14. The second end portions 104 of the chambers 100 are positioned adjacent the rear portion 60 of the inflatable curtain 14. Each of the first end portion 102, second end portion 106, and middle portion 104 of each chamber 100 has a width measured perpendicular to the horizontal direction along which the chamber extends. The width of the middle portion 104 of the chambers 100 is less than the widths of the first and second end portions 102 and 106 of the chambers.

The apparatus 10 may include a first tether 110 having a first end 112 connected to the vehicle 12 at a first location 114 on the vehicle and a second end 116 connected to the inflatable curtain 14 at a location on or near the front portion 58 of the curtain. The first location 114 may be located on or near an A pillar 160 of the vehicle. The first tether 110 may be a separate piece of material that is connected to the inflatable curtain 14 by means such as stitching, or may be woven together with the curtain.

The apparatus 10 may also include a second tether 120 having a first end 122 connected to the vehicle 12 at a second location 124 on the vehicle and a second end 126 connected to the inflatable curtain 14 at a location on or near the rear portion 60 of the curtain. The second location 124 may comprise a slider assembly 128 connected to the vehicle 12 on or near a C pillar 130 of the vehicle. The slider assembly 128 includes a track 132 and an element 134 that is slidable along the track. The second end 122 of the second tether 120 is connected to the element 134. The second tether 120 may be a separate piece of material that is connected to the inflatable curtain 14 by means such as stitching, or may be woven together with the curtain.

In the embodiment illustrated in FIG. 2, the slider assembly 128 is positioned adjacent the rear edge 56 of the inflatable curtain 14. It will be recognized by those skilled in the art, however, that the slider assembly 128 could be connected to the vehicle 12 at a location adjacent the front edge 54 of the inflatable curtain 14, in which case the first end 112 of the first tether 110 would be connected to the element 134. Also, there could be one slider assembly 128 positioned adjacent the front edge 54 of the inflatable curtain 14 and another slider assembly positioned adjacent the rear edge 56 of the curtain.

The vehicle 12 includes a sensor mechanism 150 (shown schematically in FIGS. 1 and 2) for sensing a side impact to the vehicle 12 and/or a rollover of the vehicle 12. The sensor mechanism 150 actuates the inflator 24 in response to the sensing of a side impact or a vehicle rollover.

In the event of a rollover of the vehicle 12 or a side impact to the vehicle of a magnitude greater than a predetermined threshold value, the sensor mechanism 150 provides an electrical signal over lead wires 152 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens, and the inflatable curtain 14 (FIG. 2) inflates away from the roof 18 in a downward direction as shown in the drawings and in a downward direction with respect to the direction of forward travel of the vehicle 12 into the position illustrated in FIG. 2.

Figure 4:
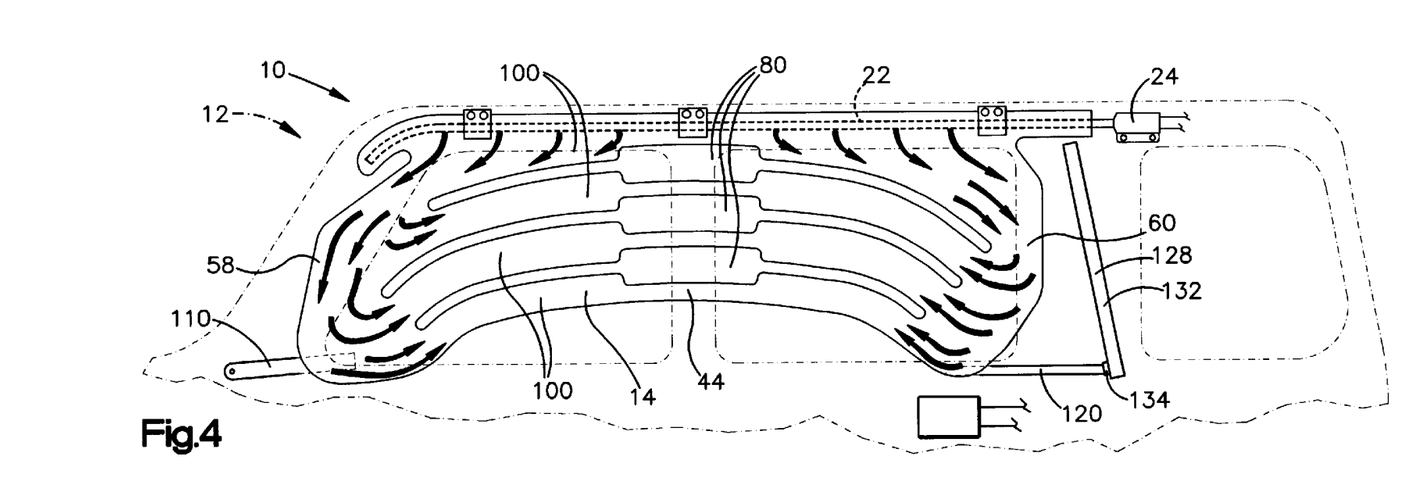
FIG. 4 is a schematic view of the apparatus of FIG. 2 in a different position.

Referring now to FIG. 4, as the inflatable curtain 14 inflates, the connection 80 positioned closest to the fill tube 22 directs the inflation fluid towards the front and rear portions 58 and 60 of the inflatable curtain 14. The flow of the inflation fluid in the inflatable curtain 14 is indicated generally by the arrows in FIG. 4. The inflation fluid is directed through the front and rear portions 58 and 60 and into the chambers 100. Thus, the front and rear portions 58 and 60 of the inflatable curtain 14 are inflated away from the vehicle roof 18 more rapidly than the chambers 100 are inflated away from the vehicle roof. This helps the front and rear portions 58 and 60 of the inflatable curtain 14 to be deployed into the position of FIG. 2 more rapidly than the portion of the curtain between the front and rear portions.

The rapid inflation and deployment of the front and rear portions 58 and 60 of the inflatable curtain 14 causes the first and second tethers 110 and 120 to be moved into the position illustrated in FIG. 4 before the curtain is completely inflated. This helps to prevent the first and second tethers 110 and 120 and the slider assembly 128 from interfering with the deployment of the inflatable curtain 14 as the curtain is inflated. The inflation of the rear portion 60 of the inflatable curtain 14 also helps to drive the element 134 along the track 132 and into the deployed position of FIG. 2.

The inflatable curtain 14 (FIG. 2), when inflated, extends along the side structure 16 of the vehicle 12 and is positioned between the side structure and any occupant of the vehicle. When the inflatable curtain 14 is in the inflated condition, the upper edge 50 of the curtain is positioned adjacent the intersection of the roof 18 and the side structure 16 of the vehicle 12. The front edge 54 of the inflatable curtain 14 is positioned adjacent the A pillar 160 of the vehicle 12. The rear edge 56 of the inflatable curtain 14 is positioned adjacent the C pillar 130 of the vehicle 12. The inflatable curtain 14 extends between the A pillar 160 and the C pillar 130 of the vehicle 12 and overlies at least a portion of the A pillar, C pillar, and a B pillar 162 of the vehicle. When the inflatable curtain 14 is inflated, the middle portions 94 of the connections 80 are positioned adjacent the B pillar 162.

It will be recognized by those skilled in the art that the inflatable curtain may have alternative configurations. For example, in the illustrated embodiment, the inflatable curtain 14 extends between the A pillar 160 and the C pillar 130 of the vehicle 12. The inflatable curtain 14 could, however, extend between the A pillar 160 and the B pillar 162 only or between the B pillar and the C pillar 130 only. Also, the inflatable curtain 14 could, when inflated, extend between the A pillar 160 and a D pillar 164 of the vehicle 12.

The inflatable curtain 14, when inflated, helps to protect a vehicle occupant in the event of a vehicle rollover or a side impact to the vehicle 12. The connections 80 help to limit the thickness of the inflated inflatable curtain 14 and help to reduce the overall volume of the curtain. The inflatable chambers 100, when inflated, help to absorb the energy of impacts with the inflatable curtain 14 and help to distribute the impact energy over a large area of the curtain.

Figure 5:
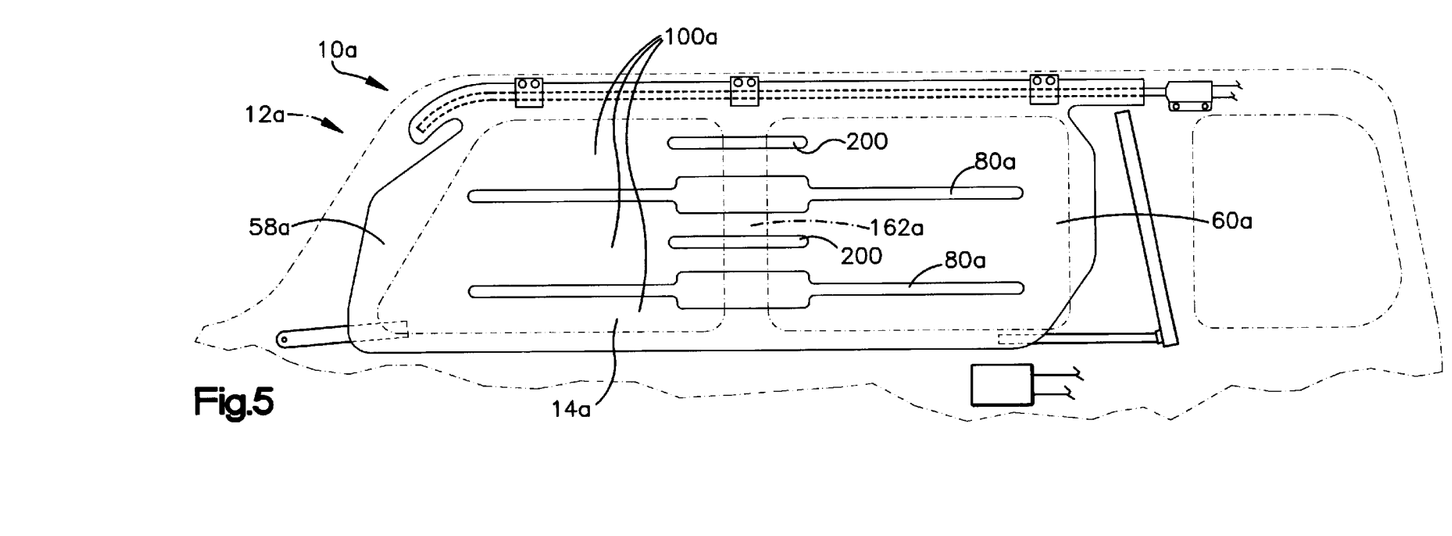
FIG. 5 is a schematic view of an apparatus for helping to protect an occupant of a vehicle according to a second embodiment of the invention.

A second embodiment of the present invention is illustrated in FIG. 5. The second embodiment of the invention is similar to the first embodiment of the invention illustrated in FIGS. 1–4. Accordingly, numerals similar to those of FIGS. 1–4 will be utilized in FIG. 5 to identify similar components, the suffix letter "a" being associated with the numerals of FIG. 5 to avoid confusion. The inflatable curtain 14a (FIG. 5) of the second embodiment is identical to the inflatable curtain 14 (FIGS. 1–4), except that the inflatable curtain 14a (FIG. 5) of the second embodiment includes connections in addition to the connections 80 (FIGS. 1–4) of the first embodiment.

As illustrated in FIG. 5, the inflatable curtain 14a includes second connections 200 that are positioned in the inflatable chambers 100a of the curtain. The second connections 200 extend in a direction generally parallel to the connections 80a, are shorter in length than the connections 80a, and have a uniform width. When the inflatable curtain 14a is in the inflated condition of FIG. 5, the second connections 200 are positioned adjacent to the B pillar 162a of the vehicle 12a.

As the inflatable curtain 14a inflates, the inflation fluid is directed through the front and rear portions 58a and 60a of the inflatable curtain 14a and into the chambers 100a. Thus, the front and rear portions 58a and 60a of the inflatable curtain 14a are inflated more rapidly than the chambers 10a are inflated. This helps the front and rear portions 58a and 60a of the inflatable curtain 14a to be deployed more rapidly than the portion of the curtain between the front and rear portions.

The inflatable curtain 14a, when inflated, helps to protect a vehicle occupant in the event of a vehicle rollover or a side impact to the vehicle 12a. The connections 80a and the second connections 200 help to limit the thickness of the inflated inflatable curtain 14a and help to reduce the overall volume of the curtain. The inflatable chambers 100a, when inflated, help to absorb the energy of impacts with the inflatable curtain 14a and help to distribute the impact energy over a large area of the curtain.

Figure 6:
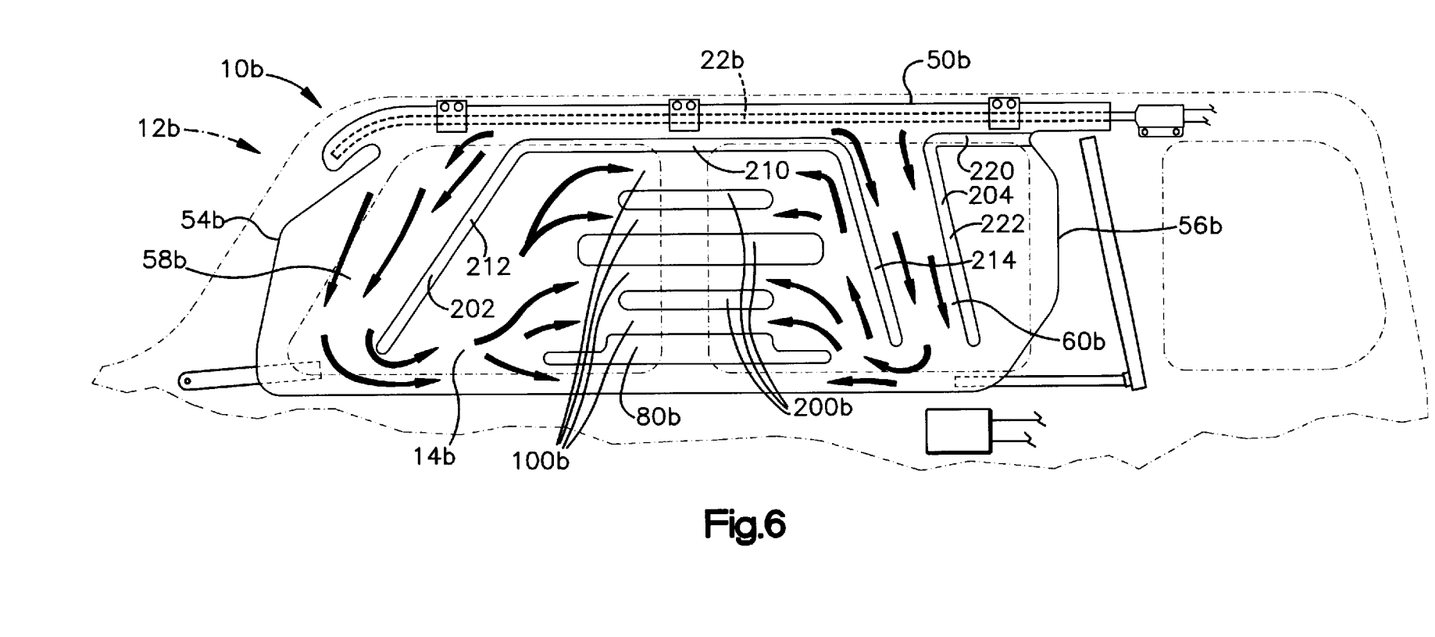
FIG. 6 is a schematic view an apparatus for helping to protect an occupant of a vehicle according to a third embodiment of the invention.

A third embodiment of the present invention is illustrated in FIG. 6. The third embodiment of the invention is similar to the second embodiment of the invention illustrated in FIG. 5. Accordingly, numerals similar to thoses of FIG. 5 will be utilized in FIG. 6 to identify similar components, the suffix letter "b" being associated with the numerals of FIG. 6 to avoid confusion. The inflatable curtain 14b (FIG. 6) of the third embodiment is identical to the inflatable curtain 14 (FIG. 5) of the second embodiment, except that the inflatable curtain 14b (FIG. 6) of the third embodiment includes connections in addition to the connections 80a, 200 (FIG. 5) of the second embodiment.

As illustrated in FIG. 6, the inflatable curtain 14b includes third and fourth connections 202 and 204 in addition to a single connection 80b and three second connections 200b. The third connection 202 includes a portion 210 that extends adjacent the upper edge 50b of the inflatable curtain 14b, parallel to the connection 80b and the second connections 200b.

The third connection 202 also includes a portion that comprises a front connection 212 and a portion that comprises a rear connection 214 of the inflatable curtain 14b. The front connection 212 is spaced away from the front edge 54b of the inflatable curtain 14b and extends transversely relative to the portion 210 of the third connection 202. The rear connection 214 is spaced away from the rear edge 56b of the inflatable curtain 14b and extends transversely relative to the portion 210 of the third connection 202.

The fourth connection 204 has a first portion 220 that intersects the rear edge 56b of the inflatable curtain 14b adjacent the upper edge 50b. The first portion 220 extends from the rear edge 56b in a direction generally parallel to the upper edge 50b of the inflatable curtain 14b. A second portion 222 of the fourth connection 204 extends from the first portion 220 in a direction generally parallel to the rear connection 214 but spaced apart from the rear connection 214.

As illustrated in FIG. 6, the front connection 212 helps to define the front portion 58b of the inflatable curtain 14b and the rear connection 214 helps to define the rear portion 60b of the inflatable curtain 14b. The fourth connection 220 extends into the rear portion 60b. When the inflatable curtain 14b is inflated, the inflation fluid flows from the fill tube 22b, through the front and rear portions 58b and 260b, around the front and rear connections 212 and 214, respectively, adjacent the lower edge of the curtain, and into the inflatable chambers 100b of the curtain. This is illustrated generally by the arrows in FIG. 6.

As the inflatable curtain 14b inflates, the inflation fluid is directed through the front and rear portions 58b and 60b of the inflatable curtain 14a and into the chambers 100b. Thus, the front and rear portions 58b and 60b of the inflatable curtain 14b are inflated more rapidly than the chambers 100b are inflated. This helps the front and rear portions 58b and 60b of the inflatable curtain 14b to be deployed more rapidly than the portion of the curtain between the front and rear portions.

The inflatable curtain 14b, when inflated, helps to protect a vehicle occupant in the event of a vehicle rollover or a side impact to the vehicle 12b. The connections 80b and the second connections 200b help to limit the thickness of the inflated inflatable curtain 14b and help to reduce the overall volume of the curtain. The inflatable chambers 100b, when inflated, help to absorb the energy of impacts with the inflatable curtain 14b and help to distribute the impact energy over a large area of the curtain.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant; and an inflation fluid source that provides inflation fluid for inflating said inflatable vehicle occupant protection device;

said inflatable vehicle occupant protection device, when inflated, having a perimeter and front and rear portions spaced apart horizontally along said inflatable vehicle occupant protection device;

said inflatable vehicle occupant protection device comprising overlying panels that define an inflatable volume and at least one connection within said perimeter at which said overlying panels are interconnected;

said at least one connection extending in a generally horizontal direction when said inflatable vehicle occupant protection device is inflated, said at least one connection including first and second end portions and a middle portion located between said first and second end portions, said first and second end portions and said middle portion each having a width measured in a direction perpendicular to said horizontal direction, said width of said middle portion being greater than said widths of said first and second end portions.

2. Apparatus as defined in claim 1, wherein said inflatable vehicle occupant protection device is an inflatable curtain having a stored position extending along the side structure adjacent the roof of the vehicle, said inflatable curtain being inflated away from the vehicle roof into said position between the side structure of the vehicle and a vehicle occupant.

3. Apparatus as defined in claim 2, wherein said middle portion of said at least one connection is positioned adjacent a B pillar of the vehicle when said inflatable curtain is inflated.

4. Apparatus as defined in claim 2, wherein said front portion of said inflatable curtain is at least partially defined by a front edge of said inflatable curtain, and said rear portion of said inflatable curtain is at least partially defined by a rear edge of said inflatable curtain.

5. Apparatus as defined in claim 4, wherein said first end portion of said at least one connection terminates adjacent said front portion of said inflatable curtain and is spaced away from said front edge of said inflatable curtain, and said second end portion of said at least one connection terminates adjacent said rear portion of said inflatable curtain and is spaced away from said rear edge of said inflatable curtain.

6. Apparatus as defined in claim 5, wherein said at least one connection at least partially defines inflatable chambers of said inflatable curtain that extend between said front and rear portions of said inflatable curtain in said generally horizontal direction.

7. Apparatus as defined in claim 6, wherein said front portion and said rear portion of said inflatable curtain are inflated away from the vehicle roof more rapidly than said inflatable chambers are inflated away from the vehicle roof.

8. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device comprising overlying panels interconnected along at least a portion of a perimeter of said panels to define an inflatable volume of said inflatable vehicle occupant protection device; and an inflation fluid source that provides inflation fluid for inflating said inflatable vehicle occupant protection device;

said inflatable vehicle occupant protection device, when inflated, having front and rear portions spaced apart horizontally along said inflatable vehicle occupant protection device, said inflatable vehicle occupant protection device including at least one connection within said perimeter at which said overlying panels are interconnected, said at least one connection defining inflatable chambers extending between said front and rear portions, said front and rear portions being adapted to inflate more rapidly away from the vehicle roof than said chambers.

9. Apparatus as defined in claim 8, wherein said chambers extend in a generally horizontal direction when said inflatable vehicle occupant protection device is inflated.

10. Apparatus as defined in claim 8, wherein said at least one connection has a length extending in a generally horizontal direction when said inflatable vehicle occupant protection device is inflated, said at least one connection including first and second end portions and a middle portion located between said first and second end portions, said first and second end portions and said middle portion each having a width measured perpendicular to said horizontal direction, said width of said middle portion being greater that said widths of said first and second end portions.

11. Apparatus as defined in claim 10, wherein said middle portion of said at least one connection is positioned adjacent a B pillar of the vehicle when said inflatable vehicle occupant protection device is inflated.

12. Apparatus as defined in claim 10, wherein said front portion of said inflatable vehicle occupant protection device is at least partially defined by a front edge of said inflatable vehicle occupant protection device that extends between an upper edge and a lower edge of said inflatable vehicle occupant protection device, and said rear portion of said inflatable vehicle occupant protection device is at least partially defined by a rear edge of said inflatable vehicle occupant protection device that extends between said upper edge and said lower edge.

13. Apparatus as defined in claim 12, wherein said first end portion of said at least one connection terminates adjacent said front portion of said inflatable vehicle occupant protection device and is spaced away from said front edge of said inflatable vehicle occupant protection device, and said second end portion of said at least one connection terminates adjacent said rear portion of said inflatable vehicle occupant protection device and is spaced away from said rear edge of said inflatable vehicle occupant protection device.

14. Apparatus as defined in claim 13, wherein said front portion is partially defined by a front connection spaced away from said front edge of said inflatable vehicle occupant protection device and extending transversely of said horizontal direction, and said rear portion is partially defined by a rear connection spaced away from said rear edge of said inflatable vehicle occupant protection device and extending transversely of said horizontal direction.

15. Apparatus as defined in claim 8, wherein said inflatable vehicle occupant protection device further comprises an upper edge and lower edge, said front and rear portions extending between said upper and lower edges, said inflation fluid flowing through said front and rear portions from adjacent said upper edge to adjacent said lower edge and then into said inflatable chambers during inflation of said inflatable vehicle occupant protection device.

16. Apparatus as defined in claim 15, wherein said front portion is partially defined by a front connection extending transversely of said chambers, and said rear portion is partially defined by a rear connection extending transversely of said chambers.

17. Apparatus as defined in claim 8, wherein said inflatable chambers are in fluid communication with each other.

18. Apparatus as defined in claim 8, wherein said overlying panels are woven together to form said at least one connection.

19. Apparatus as defined in claim 8, wherein said inflatable vehicle occupant protection device is an inflatable curtain having a stored position extending along the side structure adjacent the roof of the vehicle, said inflatable curtain being inflated away from the vehicle roof into said position between the side structure of the vehicle and a vehicle occupant.

20. Apparatus as defined in claim 8, further including a fill tube having a portion located in said inflatable vehicle occupant protection device, said inflation fluid source being in fluid communication with said fill tube, said inflation fluid source, when actuated, providing inflation fluid to said fill tube, said fill tube directing said inflation fluid into said inflatable vehicle occupant protection device to inflate said inflatable vehicle occupant protection device.

21. Apparatus as defined in claim 8, wherein said inflatable vehicle occupant protection device, when inflated, extends along the side structure of the vehicle between an A pillar and a C pillar of the vehicle.

22. Apparatus as defined in claim 8, wherein said inflatable vehicle occupant protection device, when inflated, overlies at least a portion of an A pillar, a B pillar and a C pillar of the vehicle.

23. Apparatus as defined in claim 8, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

24. Apparatus as defined in claim 8, wherein said inflation fluid source comprises an inflator which is actuatable to inflate said inflatable vehicle occupant protection device.

25. Apparatus for helping to protect an occupant of a vehicle that has a side structure and a roof, said apparatus comprising:

an inflatable vehicle occupant protection device inflatable away from the vehicle roof from a stored position to a deployed position wherein said inflatable vehicle occupant protection device is positioned between the side structure of the vehicle and a vehicle occupant; and an inflation fluid source that provides inflation fluid for inflating said inflatable vehicle occupant protection device;

said inflatable vehicle occupant protection device, when inflated, having a perimeter and front and rear portions spaced apart horizontally along said inflatable vehicle occupant protection device, said inflatable vehicle occupant protection device including at least one connection within said perimeter defining inflatable chambers extending between said front and rear portions, said front and rear portions being adapted to inflate to said deployed position before said chambers inflate to said deployed position.

26. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device comprising overlying panels interconnected to help define inflatable front and rear portions spaced apart horizontally along said inflatable vehicle occupant protection device and at least two, middle chambers extending between said front and rear portions; and an inflation fluid source that provides inflation fluid for inflating said inflatable vehicle occupant protection device;

said front and rear portions being adapted to inflate away from the vehicle roof more rapidly than said at least two middle chambers when said inflatable vehicle occupant protection device is inflated.

* * * * *